Figure 1:
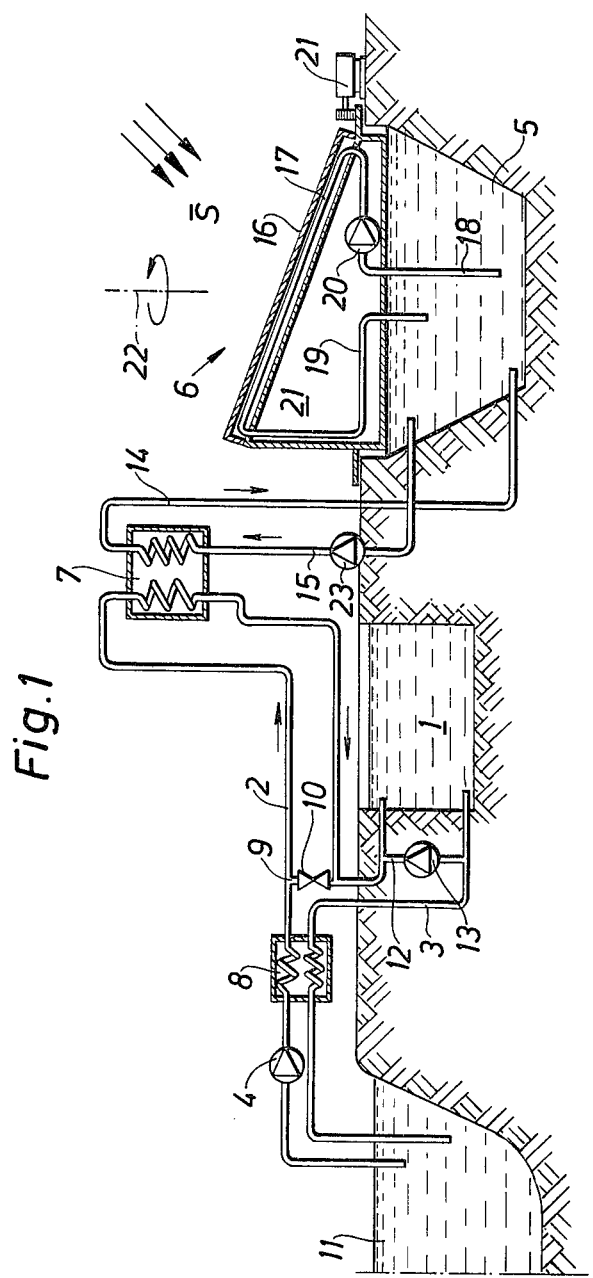

United States Patent [19]

Margen

[11] 4,258,661

[45] Mar. 31, 1981

[54] FISH POND PLANT

[75] Inventor: Peter H. E. Margen, Nyköping, Sweden

[73] Assignee: Studsvik Energiteknik AB, Nyköping, Sweden

[21] Appl. No.: 39,564

[22] Filed: May 16, 1979

[30] Foreign Application Priority Data

May 29, 1978 [JP] Japan ................................ 53-64195

[51] Int. Cl.³ .............................................. A01K 61/00
[52] U.S. Cl. ......................................... 119/3; 126/416
[58] Field of Search .................... 119/3, 2, 4; 126/415, 126/416, 435

[56] References Cited

U.S. PATENT DOCUMENTS

| | | | |
|---|---|---|---|
| 3,116,712 | 1/1964 | Ogden et al. ............................ | 119/3 |
| 3,255,731 | 6/1966 | Girard ..................................... | 119/3 |
| 4,116,222 | 9/1978 | Seifried ............................. | 126/435 X |
| 4,171,681 | 10/1979 | Berger et al. ............................ | 119/3 |

*Primary Examiner*—Hugh R. Chamblee
*Attorney, Agent, or Firm*—Burns, Doane, Swecker & Mathis

[57] ABSTRACT

A fish pond plant comprises a fish pond (1), a first conduit (2) for conducting sea water from the sea (11) to the fish pond (1), a second conduit (3) for conducting water from the pond to the sea, and pump means (4) for circulating sea water through the pond (1) via said conduits (2,3), a water magazine (5) associated with a solar collector (6) adapted to heat the magazine water, and a first heat exchanger (8) connected to said first and second conduits (2,3) to transfer heat from the sea water leaving the pond (1) to the fresh sea water entering the first conduit (2).

A second heat exchanger (7) may be connected to the first conduit (2) and adapted to heat sea water fed to the first conduit (2) by heat exchange with warm magazine water. Alternatively a third conduit (15') may be arranged to feed warm magazine water into the first conduit (2) to raise the temperature of the sea water fed to the pond (1), and a fourth conduit (14') may be connected to the first conduit (2) upstream of the connection between the first and third conduits to conduct a flow of sea water into the magazine as a substitute for the warm magazine water flow introduced in the first conduit (2).

5 Claims, 2 Drawing Figures

FISH POND PLANT

The invention refers to fish pond plants of a type comprising a fish pond, a first conduit for conducting sea water from the sea and to the fish pond, a second conduit for conducting water from the pond to the sea, a pump means for circulating sea water through the pond via the conduits.

For cultivating certain types of fish in ponds, circulation of large quantities of tempered sea water through the ponds is necessary. In tempered climates, such fish ponds are in operation for only part of the year, i.e. that part of a year during which the temperature of the sea and the heat intake from the sun in the fish ponds is sufficient to give the temperatures needed. During the remainder of a year, adequate temperatures cannot be obtained and the ponds can therefore not be used. This short period of operation limits the commercial success of such fish ponds.

It would perhaps be close at hand to heat the sea water fed to the fish ponds in order to extend the operational season of the fish pond plant, but in view of the costs for fuel necessary to heat the sea water in order to prolong the operational season in relation to the income from the extra fish production, such considerations have been rejected.

One object is therefore to provide a fish pond plant by means of which the operational season of the plant can be prolonged, even to the extent that the plant is operational throughout the year even in a tempered climate, without the necessity of using up fuel or electricity for heating purposes.

This object is according to the invention achieved in a fish pond plant comprising a fish pond, a first conduit for conducting sea water from the sea to the fish pond, a second conduit for conducting water from the pond to the sea, and pump means for circulating sea water through the pond via the conduits, by the improvements that a water magazine is associated with solar collectors adapted to heat the magazine water, that a first heat exchanger is arranged in said first and second conduits to transfer heat from the sea water leaving the pond, to the fresh sea water entering the first conduit, and that a second heat exchanger is connected to the first conduit and adapted to heat sea water fed through the first conduit by heat exchanger with warm magazine water.

Alternatively, as a modification, the improvements may comprise that a water magazine is associated with solar collectors adapted to heat the magazine water, that a third conduit is adapted to feed warm magazine water into the first conduit, to raise the temperature of the sea-water fed to the pond, that a fourth conduit is adapted to feed a flow of cold sea water from the first conduit into the magazine as substitute for the warm magazine water flow mixed into the cold sea water flowing in the first conduit, and that a first heat exchanger is connected to said first and second conduits to transfer heat from the sea water leaving the pond, to the fresh sea water entering the first conduit.

In such a plant a shunt line may be arranged to connect the first and second conduits, and a second pump means may be arranged in the shunt line in order to re-circulate part of the feed out water from the pond back into the pond. Moreover, a second shunt line may be arranged in parallel with the second heat exchanger, and a valve means may be arranged in said second shunt line in order to control the flow through the first heat exchanger.

A plant according to the invention is capable of prolonging the operational season of fish ponds in tempered climates, without requiring any fuel or electricity for heating purposes.

The only energy requirement relates to the necessity of driving water pumps and the like in the plant but these requirements are very low indeed in comparison with the heat energy supplied by the plant.

The sun collectors may be of a conventional design, but preferably the sun collector comprises a plurality of elongated parallel Fresnel-lenses arranged on an insulating lid floating on the surface of a circular water magazine and heat absorption tubes arranged in the focal lines of the lenses, said absorption tubes carrying magazine water to be heated. Alternatively, such lenses could be replaced by reflector chutes, which concentrate the reflected radiation onto the heat absorption tubes. Preferably the lid is rotatable in the horizontal plane so as to keep the longitudinal axes of the lenses aligned with the vertical plane through the solar direction throughout the day.

In the following description a non-limiting schematic embodiment of the invention will be described with reference to the enclosed drawing which illustrates schematic examples of the inventive plant.

Figure 2:
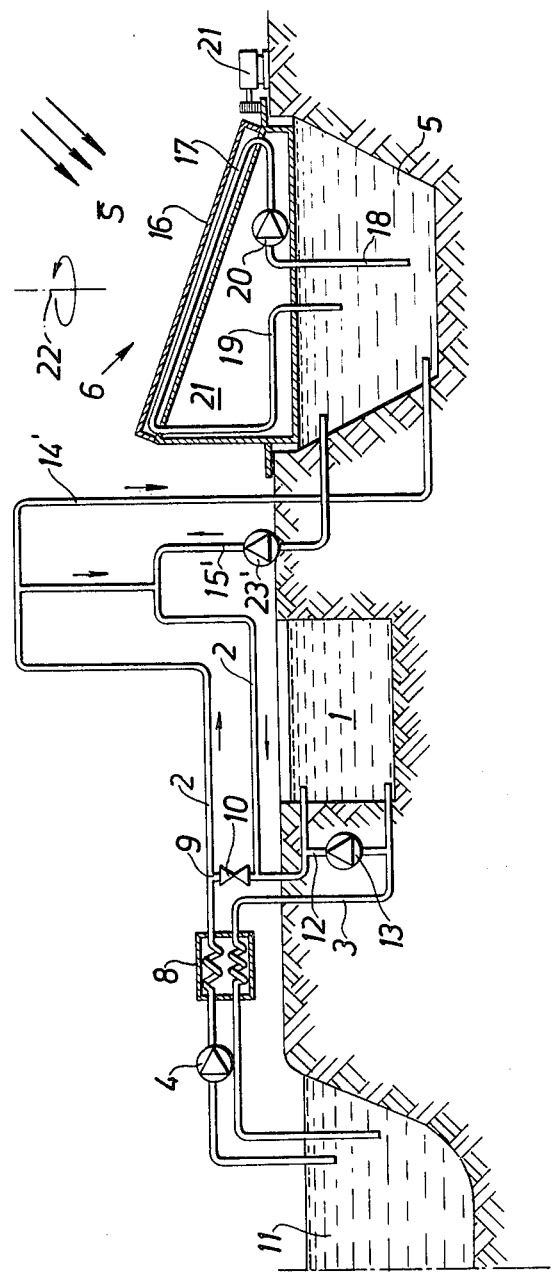

FIG. 1 shows a first example of the inventive plant.
FIG. 2 shows a second example of the inventive plant.

The drawing illustrates the sea 11, a fish pond 1 and a water magazine 5.

The magazine 5 may consist of an excavated pit lined with a ground insulation and a flexible sheet of material which makes the pit water tight. There may also be a drainage system at the back of the ground insulation to keep the insulation dry.

The water surface of the magazine 5 is covered by a platen or lid 21 which floats on the magazine water. On the top surface of the lid 21 there are a plurality of axially elongated lenses 16 arranged to concentrate incident solar radiation s onto heat absorbers in the shape of conduits 17 extending in the focal line areas of the lenses 16.

At one end the conduit 17 is connected to a line 18 which terminates in the bottom portion of the magazine 5. At the other end the conduit 17 is connected to a line 19 which terminates in the upper portion of the magazine 5. A pump 20 is arranged to pump water from the lower portion of magazine 5 through the heat absorbers 17 where the water is heated, and then via line 19 to the upper portion of the magazine 5. The entire solar collector, generally indicated by 6, is rotatable around a vertical axis 22 by means of a motor 21, which is arranged to keep the lenses 16 aligned with the vertical plane through the incident sun radiation. The lid 21 preferably has a wedge shape whereby the sun collector surface will lie nearer a normal plane to the sun direction.

In operation at least part of the water of the magazine 5 will be heated by the solar collector 6. In the magazine 5 relatively cold water will stay at the bottom of the magazine while the heated water, due to its density, will float on top of the cold water layer.

Reference is now had specifically to FIG. 1.

A pump 23 may be arranged to pump hot water from the magazine 5 via a line 15 through a heat exchanger 7 and then via a line 14 back to the bottom layer of the magazine.

Sea water from the sea 11 is pumped by means of the pump 4 via a line 2 to the heat exchanger 7 and then to the upper portion of the fish pond 1. A return line 3 extends from the lower portion of the fish pond 1 back to the sea 11. A heat exchanger 8 is coupled between the lines 2 and 3. A shunt line 9 is coupled in parallel with the heat exchanger 7 in the line 2. The shunt line 9 comprises a valve means 10. A shunt line 12 is coupled between line 2 and line 3. A pump 13 is arranged in the shunt line 12 in order to permit a re-circulation of water in the pond 1 in order to prevent temperature stratification therein.

During the warm season, the fish pond operates satisfactorily without addition of heat to the sea water fed into the pond 1. However, during the warm season, heat energy is stored as hot water in the magazine 5, which at the end of the warm season is almost completely filled with hot water. When the cold season begins, hot water from the magazine 5 is pumped through the heat exchanger 7 which transfers the heat to the fresh sea water flowing through line 2. The relatively warm water leaving the pond 1 via line 3 is cooled in the heat exchanger 8 which pre-heats the relatively cold sea water entering line 2.

During the warm season the solar collector 6 will heat the magazine water to a temperature of 75° C. and this hot water mass will be stored on a seasonal basis. During the cold season the sea water temperature may be assumed to be 8° C., and the fresh water requirement may be assumed to be 200 l/s. The sea water entering line 2 is pre-heated by the heat exchanger 8 to a temperature of 15.2° C. and is heated to 16.2° C. in the heat exchanger 7. The pump 13 may be assumed to re-circulate a flow of 400 l/s whereby the total input to the fish pond amounts to 600 l/s. The fish pond temperature is assumed to be 16° C., and thus the water leaving the pond 1 via line 3 has a temperature of 16.0° C. The resulting flow entering the fish pond 1 will then have a temperature of 16.07° C., and the non-shunted flow conducted through the heat exchanger 8 (200 l/s) is cooled to a temperature of 8.8° C. in the heat exchanger 8 before it is returned to the sea.

During these operation conditions, the hot magazine water is cooled to a temperature of 17° C. in the heat exchanger 7.

In practice, the solar collector 6 is capable of heating the magazine water to 75° C. during the warm season only. During the cold season the sun collector 6 is capable of heating the cold layer of the magazine only in some extent for example from a temperature of 17° C. to a temperature of 27° C. The water heated to 27° C. during the winter season, will form a layer between the hot water mass having a temperature of 75° C., and the cold bottom layer having a temperature of 17° C. This intermediate layer may be used for daily storage during the winter and be passed to the heat exchanger 7. Not until the intermediate layer is exhausted, the upper warm layer having a temperature of 75° C., is used to heat the incoming sea water passing the heat exchanger 7.

The embodiment according to FIG. 2 corresponding to that according to FIG. 1 except for the modification that a shunt pipe system is substituted for the heat exchanger 7 of FIG. 1.

Thus, in the embodiment according to FIG. 1 the water or liquid of the hot liquid magazine 5 is kept separate from the sea water circulated through the pond 1, whereas in the embodiment according to FIG. 2 warm water from the water magazine 5 is mixed into the fresh (preheated) sea water flowing in conduit 2, in order to raise the temperature level of the water fed into the pond 1.

In the embodiment according to FIG. 2, a conduit 15' is arranged to pass hot magazine water from the magazine 5 to the conduit 2. Another conduit 14' is connected to the conduit 2 upstream of the connection between the conduits 2 and 15'. The conduit 14' is arranged to bypass fresh sea water from conduit 2 to the lower portion of the magazine 5 in order to replace the water flow leaving the magazine via the conduit 15'. A pump 23' may be arranged in conduit 15'.

It should be noted that the shunt line system 14', 15', 23' of FIG. 2 could well be combined with the heat exchanger 7 of FIG. 1 in an inventive plant. Such a combination could be used to minimize the size (and cost) of heat exchanger 7, and at the same time to maintain an acceptable low ratio between magazine water and fresh sea water in the input flow to the fish pond 1.

What is claimed is:

1. In a fish pond plant comprising a fish pond, a first conduit for conducting sea water from the sea to the fish pond, a second conduit for conducting water from the pond to the sea, and pump means for circulating sea water through the pond via said conduits, the improvements that a water magazine is associated with a solar collector adapted to heat the magazine water, a first heat exchanger is arranged in said first and second conduits to transfer heat from the sea water leaving the pond to the fresh sea water entering the first conduit, a second heat exchanger is connected to the first conduit and adapted to heat sea water fed to the first conduit by heat exchange with warm magazine water, a shunt line connects said first and second conduits and a second pump means in the shunt line is arranged to re-circulate part of the water fed from the pond back into the pond.

2. In a fish pond plant comprising a fish pond, a first conduit for conducting sea water from the sea to the fish pond, a second conduit for conducting water from the pond to the sea, and pump means for circulating sea water through the pond via said conduits, the improvements that a water magazine is associated with a solar collector adapted to heat the magazine water, a third conduit is arranged to feed warm magazine water into the first conduit to thereby raise the temperature of the sea water fed to the pond, a fourth conduit is connected to the first conduit upstream of the connection between the first and the third conduits to conduct a flow of sea water into the magazine as a substitute for the warm magazine water flow introduced in the first conduit, and a heat exchanger is connected to said first and second conduits in order to transfer heat from the water leaving via the second conduit to the fresh sea water entering the first conduit.

3. A plant according to claim 2 wherein a shunt line connects said first and second conduits, and a second pump means in the shunt line is arranged to re-circulate part of the water fed from the pond back into the pond.

4. A plant according to claim 2 wherein a shunt line is arranged in parallel with the first conduit, and a valve means is arranged in said second shunt line in order to control the flow from the heat exchanger.

5. In a fish pond plant comprising a fish pond, a first conduit for conducting sea water from the sea to the fish pond, a second conduit for conducting water from the pond to the sea, and a pump for circulating sea water through the pond via said conduits, the improvement comprising a water magazine associated with a solar collector adapted to heat the magazine water, a first heat exchanger arranged in said first and second conduits to transfer heat from the sea water leaving the pond to the fresh sea water entering the first conduit, a second heat exchanger connected to the first conduit and adapted to heat sea water fed to the first conduit by heat exchange with warm magazine water, a shunt line arranged in parallel with the first conduit, and valve means arranged in said second shunt line for controlling the flow of water through said second heat exchanger.

* * * * *